(12) United States Patent
Villena et al.

(10) Patent No.: US 7,230,927 B1
(45) Date of Patent: Jun. 12, 2007

(54) NON-BLOCKING EXPANDABLE CALL CENTER ARCHITECTURE

(75) Inventors: Jose Villena, Miami, FL (US); Jeffrey Stout, Miami, FL (US); Eyal Ben-Chanoch, Miami, FL (US); Herrick Gooden, Fort Lauderdale, FL (US)

(73) Assignee: Aspect Software, Inc., Westford, MA (US)

( * ) Notice: Subject to any disclaimer, the term of this patent is extended or adjusted under 35 U.S.C. 154(b) by 0 days.

(21) Appl. No.: 09/456,166

(22) Filed: Dec. 7, 1999

(51) Int. Cl.
*G01R 31/08* (2006.01)

(52) U.S. Cl. ...................... 370/252; 370/220

(58) Field of Classification Search ........... 379/265.01, 379/266.1; 370/259, 270, 352, 353, 354, 370/355, 356, 401, 389
See application file for complete search history.

(56) References Cited

U.S. PATENT DOCUMENTS

| | | | |
|---|---|---|---|
| 3,333,271 A | 7/1967 | Robinson et al. | 343/113 |
| 4,066,847 A | 1/1978 | Giordano | 179/99 |
| 4,228,535 A * | 10/1980 | Workman et al. | 370/220 |
| 4,286,118 A | 8/1981 | Mehaffey et al. | 179/18 D |
| 4,356,348 A | 10/1982 | Smith | 179/1 MN |
| 4,392,129 A | 7/1983 | Mehaffey et al. | 340/765 |
| 4,408,100 A | 10/1983 | Pritz et al. | 179/27 D |
| 4,477,698 A | 10/1984 | Szlam et al. | 179/90 BD |
| 4,494,229 A | 1/1985 | Jolissaint | 370/58 |
| 4,510,351 A | 4/1985 | Costello et al. | 179/27 D |
| 4,540,855 A | 9/1985 | Szlam et al. | 179/84 R |
| 4,593,273 A | 6/1986 | Narcisse | 340/539 |
| 4,599,493 A | 7/1986 | Cave | 179/18 FH |
| 4,600,814 A | 7/1986 | Cunniff et al. | 179/18 BC |
| 4,674,083 A * | 6/1987 | Rackin | 370/363 |
| 4,677,663 A | 6/1987 | Szlam | 379/211 |
| 4,692,858 A | 9/1987 | Redford et al. | 364/200 |
| 4,694,483 A | 9/1987 | Cheung | 379/34 |
| 4,710,769 A * | 12/1987 | Friedman et al. | 370/359 |
| 4,720,853 A | 1/1988 | Szlam | 379/211 |
| 4,742,537 A | 5/1988 | Jesurum | 379/351 |
| 4,742,538 A | 5/1988 | Szlam | 379/361 |
| 4,742,539 A | 5/1988 | Szlam | 379/377 |
| 4,757,267 A | 7/1988 | Riskin | 379/113 |
| 4,782,463 A | 11/1988 | Sanders | 364/900 |
| 4,782,510 A | 11/1988 | Szlam | 379/88 |
| 4,792,968 A | 12/1988 | Katz | 379/92 |
| 4,797,911 A | 1/1989 | Szlam et al. | 379/67 |
| 4,811,240 A | 3/1989 | Balluo et al. | 364/518 |

(Continued)

FOREIGN PATENT DOCUMENTS

EP 0855826 7/1998

OTHER PUBLICATIONS

Jackie Taylor, "Contact Center Professional 4", "Call Center", Jun. 5, 2001, www.callcentermagazine.com/article.*

(Continued)

*Primary Examiner*—Doris H. To
*Assistant Examiner*—Steve Blount
(74) *Attorney, Agent, or Firm*—Bourque and Associates

(57) ABSTRACT

An improved call center architecture includes a switch which communicates with agents either over a broadband network or through a conventional legacy PBX. The hybrid configuration also includes N+1 fault tolerance and the ability to linearly expand the capacity of the system by simply adding new switching chassis.

11 Claims, 3 Drawing Sheets

U.S. PATENT DOCUMENTS

| | | | |
|---|---|---|---|
| 4,829,563 A | 5/1989 | Crockett et al. | 379/309 |
| 4,858,120 A | 8/1989 | Samuelson | 364/401 |
| 4,866,638 A | 9/1989 | Cosentino et al. | 364/521 |
| 4,881,261 A | 11/1989 | Oliphant et al. | 379/215 |
| 4,894,857 A | 1/1990 | Szlam et al. | 379/67 |
| 4,896,345 A | 1/1990 | Thorne | 379/67 |
| 4,933,964 A | 6/1990 | Girgis | 379/67 |
| 4,939,771 A | 7/1990 | Brown et al. | 379/67 |
| 4,939,773 A | 7/1990 | Katz | 379/204 |
| 4,988,209 A | 1/1991 | Davidson et al. | 370/58 |
| 5,021,976 A | 6/1991 | Wexelblat et al. | 364/521 |
| 5,041,992 A | 8/1991 | Cunningham et al. | 364/518 |
| 5,062,103 A | 10/1991 | Davidson et al. | 370/58.1 |
| 5,070,525 A | 12/1991 | Szlam et al. | 379/196 |
| 5,115,501 A | 5/1992 | Kerr | 395/600 |
| 5,119,072 A | 6/1992 | Hemingway | 340/573 |
| 5,119,475 A | 6/1992 | Smith et al. | 395/156 |
| 5,121,477 A | 6/1992 | Koopmans et al. | 395/156 |
| 5,175,761 A | 12/1992 | Ramsey et al. | 379/89 |
| 5,179,657 A | 1/1993 | Dykstal et al. | 395/161 |
| 5,179,700 A | 1/1993 | Aihara et al. | 395/650 |
| 5,181,236 A | 1/1993 | LaVallee et al. | 379/67 |
| 5,206,903 A | 4/1993 | Kohler et al. | 379/309 |
| 5,214,688 A | 5/1993 | Szlam et al. | 379/67 |
| 5,276,731 A | 1/1994 | Arbel et al. | 379/88 |
| 5,283,786 A * | 2/1994 | Hoff et al. | 370/363 |
| 5,309,505 A | 5/1994 | Szlam et al. | 379/88 |
| 5,309,513 A | 5/1994 | Rose | 379/265 |
| 5,335,269 A | 8/1994 | Steinlicht | 379/266 |
| 5,343,193 A * | 8/1994 | Shoda et al. | 340/2.21 |
| 5,345,589 A | 9/1994 | King et al. | 395/650 |
| 5,357,254 A | 10/1994 | Kah | 342/42 |
| 5,386,412 A | 1/1995 | Park et al. | 370/53 |
| 5,428,827 A | 6/1995 | Kaaser | 455/161.3 |
| 5,430,792 A | 7/1995 | Jesurum et al. | 379/67 |
| 5,440,616 A | 8/1995 | Harrington et al. | 379/88 |
| 5,490,211 A | 2/1996 | Adams | 379/265 |
| 5,495,474 A * | 2/1996 | Olnowich et al. | 370/359 |
| 5,500,891 A | 3/1996 | Harrington et al. | 379/265 |
| 5,511,112 A | 4/1996 | Szlam | 379/88 |
| 5,511,117 A | 4/1996 | Zazzera | 379/265 |
| 5,519,773 A | 5/1996 | Dumas et al. | 379/265 |
| 5,533,109 A | 7/1996 | Baker | 379/201 |
| 5,535,270 A | 7/1996 | Doremus et al. | 379/266 |
| 5,546,456 A | 8/1996 | Vilsoet et al. | 379/265 |
| 5,553,133 A | 9/1996 | Perkins | 379/265 |
| 5,555,179 A | 9/1996 | Koyama et al. | 700/95 |
| 5,568,544 A | 10/1996 | Keeler et al. | 379/273 |
| 5,579,368 A | 11/1996 | Berkum | 379/15 |
| 5,581,602 A | 12/1996 | Szlam et al. | 379/67 |
| 5,586,178 A | 12/1996 | Koenig et al. | 379/265 |
| 5,588,045 A | 12/1996 | Locke | 379/67 |
| 5,594,781 A | 1/1997 | Kozdon et al. | 379/60 |
| 5,594,791 A | 1/1997 | Szlam et al. | 379/265 |
| 5,619,557 A | 4/1997 | Berkum | 379/88 |
| 5,623,540 A | 4/1997 | Morrison et al. | 379/115 |
| 5,675,637 A | 10/1997 | Szlam et al. | 379/142 |
| 5,689,240 A | 11/1997 | Traxler | 340/573 |
| 5,696,818 A | 12/1997 | Doremus et al. | 379/265 |
| 5,714,932 A | 2/1998 | Castellon et al. | 340/539 |
| 5,715,307 A | 2/1998 | Zazzera | 379/265 |
| 5,722,059 A | 2/1998 | Campana | 455/226.2 |
| 5,722,064 A | 2/1998 | Campana | 455/351 |
| 5,724,347 A * | 3/1998 | Bell et al. | 370/377 |
| 5,729,600 A | 3/1998 | Blaha | 379/265 |
| 5,742,233 A | 4/1998 | Hoffman et al. | 340/573 |
| 5,765,033 A | 6/1998 | Miloslavsky | 709/206 |
| 5,815,565 A | 9/1998 | Doremus et al. | 379/265 |
| 5,825,283 A | 10/1998 | Camhl | 340/438 |
| 5,825,869 A | 10/1998 | Brooks et al. | 379/265 |
| 5,828,731 A | 10/1998 | Szlam et al. | 379/88 |
| 5,832,059 A | 11/1998 | Aldred et al. | 379/34 |
| 5,832,070 A | 11/1998 | Bloom et al. | 379/265 |
| 5,857,014 A | 1/1999 | Sumner et al. | 379/93.02 |
| 5,864,615 A | 1/1999 | Dezonno | 379/265 |
| 5,915,012 A * | 6/1999 | Miloslavsky | 379/265.02 |
| 5,926,539 A | 7/1999 | Shtivelman | 379/266.01 |
| 5,940,494 A | 8/1999 | Rafacz | 379/265 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 5,963,635 A | 10/1999 | Szlam et al. | 379/309 |
| RE36,416 E | 11/1999 | Szlam et al. | 379/88.09 |
| 5,991,394 A | 11/1999 | Dezonno et al. | 379/265 |
| 6,002,760 A | 12/1999 | Gisby | 379/266.01 |
| 6,005,920 A * | 12/1999 | Fuller et al. | |
| 6,021,428 A | 2/2000 | Miloslavsky | 709/206 |
| 6,044,145 A | 3/2000 | Kelly et al. | 379/265.02 |
| 6,044,146 A | 3/2000 | Gisby et al. | 379/265 |
| 6,044,355 A | 3/2000 | Crockett et al. | 705/8 |
| 6,044,368 A | 3/2000 | Powers | 707/2 |
| 6,067,357 A | 5/2000 | Kishinsky et al. | 379/265.02 |
| 6,108,711 A | 8/2000 | Beck et al. | 709/242 |
| 6,118,763 A | 9/2000 | Trumbull | 370/231 |
| 6,134,530 A | 10/2000 | Bunting et al. | 705/7 |
| 6,138,139 A | 10/2000 | Beck et al. | 709/202 |
| 6,157,655 A | 12/2000 | Shtivelman | 370/412 |
| 6,167,395 A | 12/2000 | Beck et al. | 707/3 |
| 6,170,011 B1 | 1/2001 | Macleod Beck et al. | 709/224 |
| 6,175,563 B1 | 1/2001 | Miloslavsky | 370/352 |
| 6,175,564 B1 | 1/2001 | Miloslavsky et al. | 370/352 |
| 6,185,292 B1 | 2/2001 | Miloslavsky | 379/265.01 |
| 6,269,153 B1 | 7/2001 | Carpenter et al. | 379/88.02 |
| 6,272,347 B1 | 8/2001 | Griffith et al. | 455/445 |
| 6,285,680 B1 * | 9/2001 | Steinka et al. | 370/431 |
| 6,314,089 B1 | 11/2001 | Szlam et al. | 370/270 |
| 6,339,593 B1 * | 1/2002 | Kikinis | |
| 6,345,305 B1 | 2/2002 | Beck et al. | 709/242 |
| 6,359,892 B1 | 3/2002 | Szlam | 370/401 |
| 6,359,982 B1 | 3/2002 | Foster et al. | 379/266.06 |
| 6,362,838 B1 | 3/2002 | Szlam et al. | 345/762 |
| 6,363,065 B1 * | 3/2002 | Thornton et al. | 370/352 |
| 6,373,836 B1 | 4/2002 | Deryugin et al. | 370/352 |
| 6,389,007 B1 | 5/2002 | Shenkman et al. | 370/352 |
| 6,389,132 B1 * | 5/2002 | Price | |
| 6,393,015 B1 | 5/2002 | Shtivelman | 370/352 |
| 6,445,784 B2 * | 9/2002 | Uppaluru et al. | |
| 6,732,156 B2 | 5/2004 | Miloslavsky | 709/206 |
| 2002/0047859 A1 | 4/2002 | Szlam et al. | 345/705 |
| 2002/0067822 A1 | 6/2002 | Cohen et al. | 379/265.12 |
| 2002/0143878 A1 | 10/2002 | Birnbaum et al. | 709/205 |
| 2002/0145624 A1 | 10/2002 | Szalm et al. | 345/738 |
| 2002/0161896 A1 | 10/2002 | Wen et al. | 709/227 |

OTHER PUBLICATIONS

"Cellit Sells It Whole; One Stop vs. Open-Systems Shopping", "Unified Communications Alert" www.ucalerT.com/2000, date unknown.*

"Customer Interaction Management Solutions For The New Economy" www.Amvia.com/contact-center, date unknown.*

Lee Hollman, Will Communications Serves Make The PBX Extinct? "Call Center" www.callcentermagazine.com/article, Nov. 5, 2000.*

M2 Presswire, 3COM: Cell IT launches breakthrough multimedia call center solution based on high speed 3Com systems; Mar. 4, 1998; 1-3 webpages; Coventry.

AT & T Technology; In The Forefront With Integrated Call Centers; Winter 1992; 1-7 webpages; New York.

Telemarketing & Call Center Solutions; How a Travel-Industry Call Center Excels; Sep. 1997; 1-2 webpages; Norwalk.

* cited by examiner

NON-BLOCKING EXPANDABLE CALL CENTER ARCHITECTURE

TECHNICAL FIELD

This invention relates to call centers, and in a more general sense, contact centers for customer interface via telephone, and other media, with a plurality of agents at the contact center.

BACKGROUND OF THE INVENTION

Most large corporations implement contact centers, an arrangement whereby customers may call in with questions regarding accounts, complaints, or other issues. A typical example of such a contact center might be a credit card company, which maintains a plurality of agents at one or more locations to handle customer inquiries, account questions, etc. Recently, these call centers may be more generally referred to as contact centers, since the agent customer interaction may not be limited telephone calls. Rather, agent customer interaction may include items such as web chat, e-mail, or other forms of interaction between an agent and a customer.

FIG. 1 shows a conventional prior art legacy call center configuration. The arrangement includes a variety of distinct components that are usually patched together in order to provide the required services. The arrangement of FIG. 1 includes various reporting capabilities, different servers and gateways, and a variety of agents, all connected to a PBX. It also includes independent, disparate voice processing applications, such as voice mail and fax servers.

A variety of problems are present with respect to such prior art systems. First, the ability to grow the system is extremely limited. As more lines are required, more PBXs must be added. The PBXs must then be connected to all of the other PBXs. If four PBXs are to be used, for example, then each of the PBXs must be connected to three other PBXs. This creates a complicated system which cannot be efficiently or easily expanded. The switching capacity of each PBX is used up largely to connect to other PBXs rather than to perform switching of contacts for servicing.

Another problem with such legacy prior art systems is that of fault tolerance, if fault tolerance is even available at all. Specifically, a typical manner in which fault tolerance is implemented at such systems is to run a ghosting processor for every critical system. If a particular system element requires fault tolerance, then two of those elements must be run constantly, with one acting as a hot spare. This also causes a tremendous amount of excess cost to be introduced into the system.

Still another problem with prior art systems is that the switching capacity of the PBX is typically not enough to insure a non-blocking system. Specifically, in prior art systems, the main interface from the call center to the public switched telephone network (PSTN) is typically a PBX. The PBX is configured to have a switching capacity based upon the expected statistics regarding call volume and services requested. As a result, it is possible that an agent, voice mail, IVR or other system resource may be available, but a caller may nonetheless be blocked because the system has run out of switching capacity in order to connect the available resource to the caller. In such a situation, the caller is frustrated and the call center operator may lose business.

In view of the above, there exists a need in the art for a more flexible and expandable call center architecture.

There also exists a need in the art for a call center which can provide back-up of critical resources without having to recreate every resource twice.

There also exists a need in the art for a system which can be easily expanded by adding resources without having to reconfigure the entire system.

SUMMARY OF THE INVENTION

The above and other problems of the prior art are overcome in accordance with the present invention which relates to an easily expandable call center environment with fault tolerance. One or more chassis are utilized which each include switching capacity for connecting callers to a variety of call center resources. Additionally, each chassis contains one or more conference bridges for allowing call supervision, conferencing, etc. In the case of plural chassis, they are interconnected via a broadband network such as ATM, etc. One or more additional chassis is also provided for back-up of all other chassis. If any of the plural chassis fails, the back-up may be utilized by rerouting calls through it to any other resource or agent in the call center.

Additionally, the chassis are interconnected in a manner that reserves bandwidth from the broadband network for such interconnection, rather than switching capacity of each chassis. Accordingly, the capacity of the call center is linearly expandable, and does not require the switching resources of the PBX in order to connect to other PBXs for expansion.

In an additional enhanced embodiment, the switching and resource platform may be configured in a hybrid manner that allows for a combination of narrowband/broadband operation. Specifically, the switching/resource platform may connect to call center agents partially through an existing PBX with permanent connections to the call center agents, and partially over a broadband communications network such as an Ethernet or ATM switch. By providing such hybrid operation, existing technology can be utilized and can be phased out as the system is grown and expanded. The functionality implemented by connecting the agent stations to the switching and resource platform 210 is the same, irrespective of whether such connection is through the PBX 301 or LAN 208. The switching and resource platform 210 may be implemented as the CCPRO product, available from the assignee of the present invention.

A more complete understanding of the present invention may be had by referring to the annexed drawings and following description of the invention.

DETAILED DESCRIPTION OF THE PREFERRED EMBODIMENT

Figure 1:
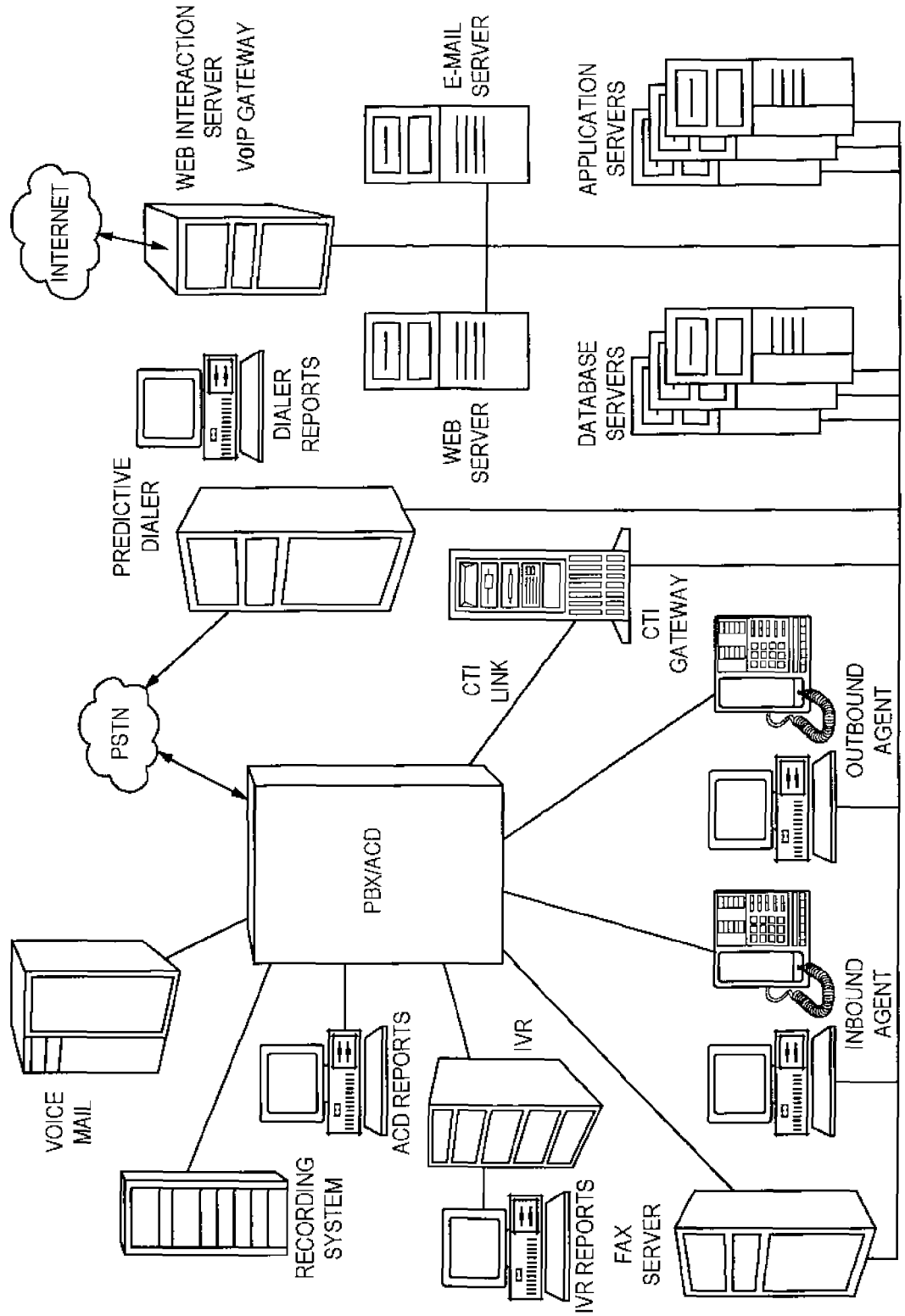
FIG. 1 depicts a prior art legacy call center configuration.
Figure 2:
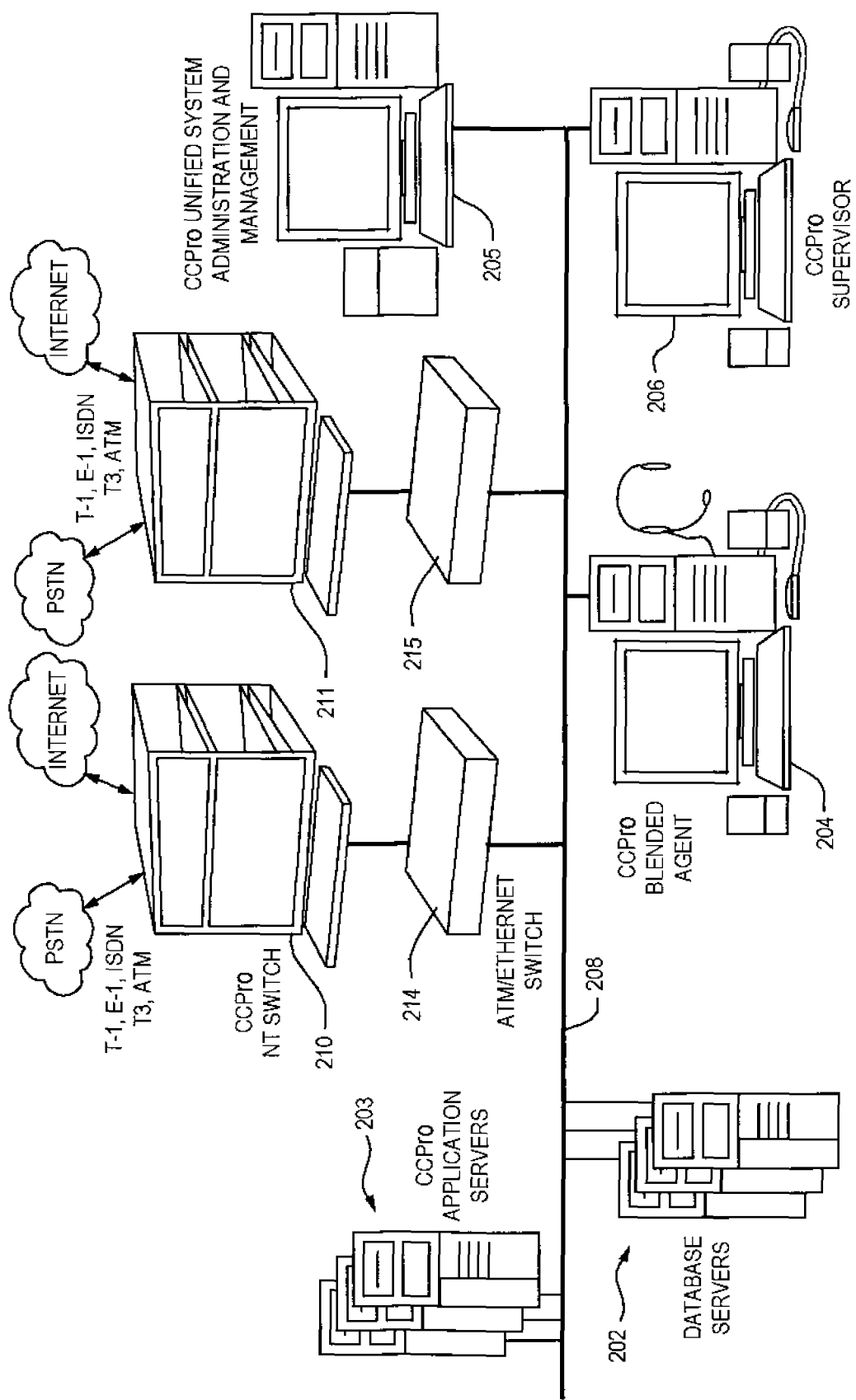
FIG. 2 shows an exemplary configuration of the present invention wherein a switching arrangement is connected to various agents and servers via a broadband switching arrangement instead of a PBX.

FIG. 2 shows an exemplary arrangement for implementing the present invention in what is termed a broadband configuration. The arrangement of FIG. 2 includes one or more database servers 202 and application servers 203, agent stations 204 (only one of which is shown), and supervisory and management functions 205 and 206. The various computer systems are interconnected via a broadband communications network such as an Ethernet or ATM network 208. Any other type of network is possible as well. The incoming and outgoing contacts, both PSTN and Internet, are handled by two CCPRO switches, each of which interfaces to the network 208 via interface 214 and 215, respectively. The CCPRO switches are available from the assignee of the present invention and may operate in place of, or in conjunction with, a PBX. Each CCPRO switch is resident within one chassis, and includes plural boards to implement the switching capacity.

The particular chassis within which the switch 210 or 211 resides includes four potential points of interface for information to enter or exit the chassis. First, there are incoming trunks (which may be Internet telephony or PSTN as shown), the number of which is denoted herein T.

Second, each switching chassis is responsible for handling a number S of agent stations, one of which is shown as 204. Third, the CCPRO switch chassis includes call processing resources of its own such as a conference bridge. Each resource might have to be connected to something else. If R is the number of such other resources, this represents, worst case, R points of interface.

Finally, there are a number B of broadband connections reserved for connecting the chassis to other chassis such that switches 210 and 211 may communicate with one another. The number B represents only the broadband connections utilized to interconnect the switches, and does not include other communications over the broadband network.

The preferred strategy is to insure that there is enough switching capacity within the CCPRO chassis to insure that if any agent or other desired resource is available, a caller can be connected to that agent or resource. Moreover, the system should insure that the resources managed by and connected to any switch chassis 210, 211 or others can be used interchangeably by agents and callers connected to other chassis.

In order to insure such a technique, B, the number of connections used to interconnect the chassis to each other must be set at an appropriate level. Specifically, in the worst case scenario, every one of the trunks T and stations S may need to be simultaneously in communication via the broadband connections B to another chassis. This means in the worst case scenario, B>=T+S. Moreover, the switching arrangement is implemented within the chassis in a conventional fashion using time division multiplexing (TDM). It can be shown that in order to insure that no available connection is blocked because of lack of switching capacity, the number of time slots required within the switch is T+S+R+B, with resources R including conference, recording, and playback resources. By setting the time slots appropriately or, alternately, setting T, S, R, and B appropriately for a given number of timeslots, no blocking will occur and the system will be linearly expandable.

By linearly expandable we mean that the switching channels present in an added CCPRO switch chassis may all be utilized for call switching. This is in contrast to prior systems in which much of the switching capacity has to be utilized to interface to other PBXs, particularly as the number of PBXs increases.

Figure 3:
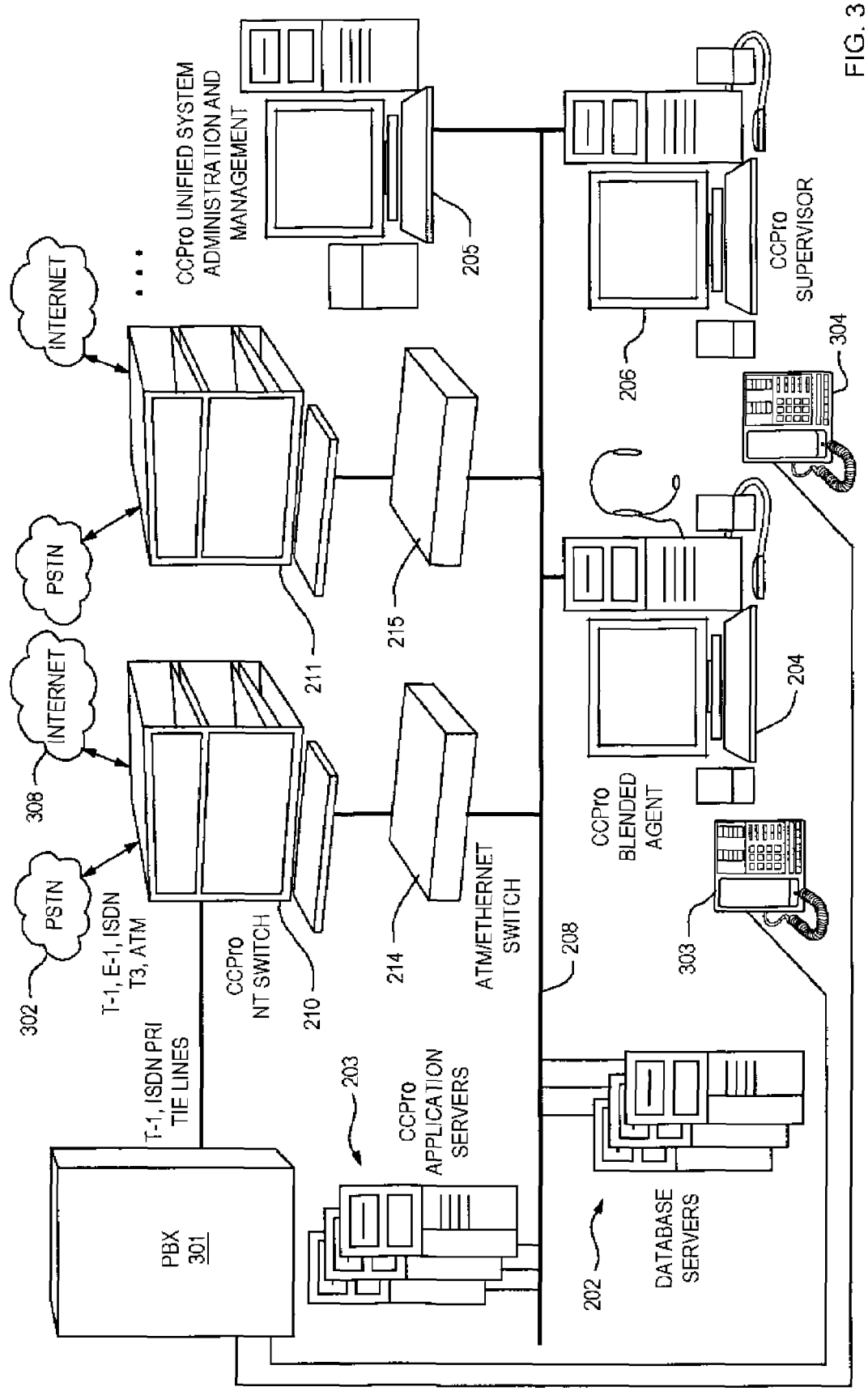
FIG. 3 depicts an environment in which a switching arrangement is connected to various agents through a PBX and to additional agents through a separate network such as a ATM or Ethernet.

FIG. 3 shows an additional embodiment of the present invention wherein like components have been labeled with similar numbers. The embodiment of FIG. 3 includes an additional component 301 which may be a legacy type of PBX.

As shown in FIG. 3, a plurality of connections to agent phones 303 and 304 may be connected to the CCPRO switch chassis 210 through the legacy PBX. This permits a company already utilizing a legacy call center architecture to add the CCPRO chassis without discarding their old equipment or redesigning their entire architecture.

In operation, the CCPRO switch would dial up the agents 303 and 304 through extensions on a PBX and leave such connections permanently in place. This dial up connection through the PBX is accomplished by having the CCPRO switch call the agent through the PBX in response to the agent logging into the CCPRO system. Notably, although only two agents are shown, many other blended agents may be connected to network 208 and may communicate with the switch not through the PBX 301 but directly through the broadband network 208. Accordingly, a hybrid upgrade configuration is established whereby of a plurality of agents, several of the agents may communicate with the CCPRO switch via the PBX, and several may communicate with the switch via network 208. Ideally, the customer may begin utilizing the system by establishing all of the connections to its agents through the PBX 301. As capacity expands and the PBX contains no further ports, further connections from the chassis 210 or other chassis 211, etc., may be done directly through the broadband network 208. Alternatively, all contacts to and from the CCPRO switch, both inbound and outbound and regardless of media type, may be completed by connecting agents through the PBX on a permanent basis by having the CCPRO switch 210 dial up the agents through PBX 301. All of the agent terminals may be connected to the CCPRO switch 210 notwithstanding the LAN 208 that interconnects the agent terminals and the CCPRO switch. The CCPRO switch would maintain its connections to the agents while performing its telephony functions such as hold, transfer, conference, record, and other similar voice processing functions.

An additional advantageous feature of the present architecture is the implementation of N+1 redundancy among call center switches. Specifically, FIG. 3 shows exemplary switches 210 and 211 in separate chassis. In actuality, the system is linearly growable so that capacity may be added simply by adding more trunks and more of such chassis 210 and 211.

Rather than constantly run a "hot spare," for each component, the system achieves redundancy and back-up in a manner that only requires one additional chassis and switch for all of the switches running in the system. Specifically, an exemplary system may run five or six different CCPRO switches such as those depicted as 210 and 211. Since the system has reserved enough bandwidth for any switch to communicate with the agents and other resources of any other switch, any of the CCPRO switches can service the capacity of any of the other ones. Accordingly, if there are five in the system, a sixth may be used as a hot spare to back-up any of the five operating switches which fails. In accordance with such a technique, if, for example, CCPRO switch 210 fails, the PSTN and Internet networks 307 and 308 would detect such failure and automatically route trunks destined originally for 210 to an additional and different N+1 redundant switch installed for the purpose of fault tolerance.

It is possible to use more back-up CCPRO switches (e.g., M) to obtain more reliable redundancy, but the N+M redundancy architecture eliminates the need for a hot spare with respect to each CCPRO switch. That is, M may be less than N, and the smaller M is, the less fault tolerance but the more savings, M could be one and still provide back-up.

While the foregoing describes the preferred embodiment of the invention, various modifications and/or additions will be apparent to those skill in the art. Such modifications are intended to be covered by the following claims.

What is claimed is:

1. A switching apparatus for a contact center having:
    a local area network;
    a public network; and
    a first switching apparatus being configured to connect to said public network and being configured to communicate over said local area network with a second switching apparatus wherein the first switching apparatus has a trunk interface for communicating to the public network with a number of trunk channels equal to T; an agent station interface with a number of channels to couple to agent stations equal to S; a processing resources interface with a number of channels to couple to processing resources equal to R; and a switching device interface with a number of channels to couple to the second switching device equal to B, the improvement comprising said first switching apparatus having a number of channels reserved to couple to said second switching device, wherein B (number of switching device channels) is greater than or equal to T (number of trunk channels) plus S (number of agent station channels).

2. The contact center of claim 1 wherein public network interface includes Public Switch Telephone Network (PSTN).

3. The contact center of claim 1 wherein public network interface includes internet telephony.

4. The contact center of claim 1 wherein processing resources interface includes conference, recording, and playback resources.

5. The contact center of claim 1 wherein said first switching apparatus includes time division multiplexing for providing interface channels.

6. The contact center of claim 5 wherein a number of channels provided allows said contact center to be linearly expandable and the switching channels in the second switching apparatus are all utilized for call switching rather than interfacing with other switching apparatus.

7. The contact center of claim 5 wherein a number of channels provided equals B (number of switching device channels) plus T (number of trunk channels) plus S (number of agent station channels) plus R (number of processing resources channels).

8. The contact center of claim 5 wherein B (number of switching device channels), T (number of trunk channels), S (number of agent station channels), and R (number of processing resources channels) are set based on the number of interface channels provided such that said contact center to be linearly expandable and the switching channels in the second switching apparatus are all utilized for call switching rather than interfacing with other switching apparatus.

9. The contact center of claim 1 wherein the agent station channels are connected to said first switching apparatuses through a legacy PBX.

10. The contact center of claim 1 wherein contact center further comprises a backup switching apparatus and a means for detecting when said first switching apparatus is faulty and activating said backup switching apparatus for service.

11. The contact center of claim 1 wherein contact center further comprises a backup switching apparatus and a means for detecting when one of said first switching apparatus and said second switching apparatus is faulty and activating said backup switching apparatus for service, said backup apparatus being configured to service one of said first switching apparatus and said second switching apparatus which is detected as failing.

* * * * *